May 4, 1954   C. W. BERTHIEZ   2,677,284
MANUALLY OPERABLE SPEED CONTROL FOR MACHINE TOOLS OR THE LIKE
Original Filed April 7, 1948   11 Sheets-Sheet 1

INVENTOR
Charles William Berthiez
By George H. Corey
ATTORNEY

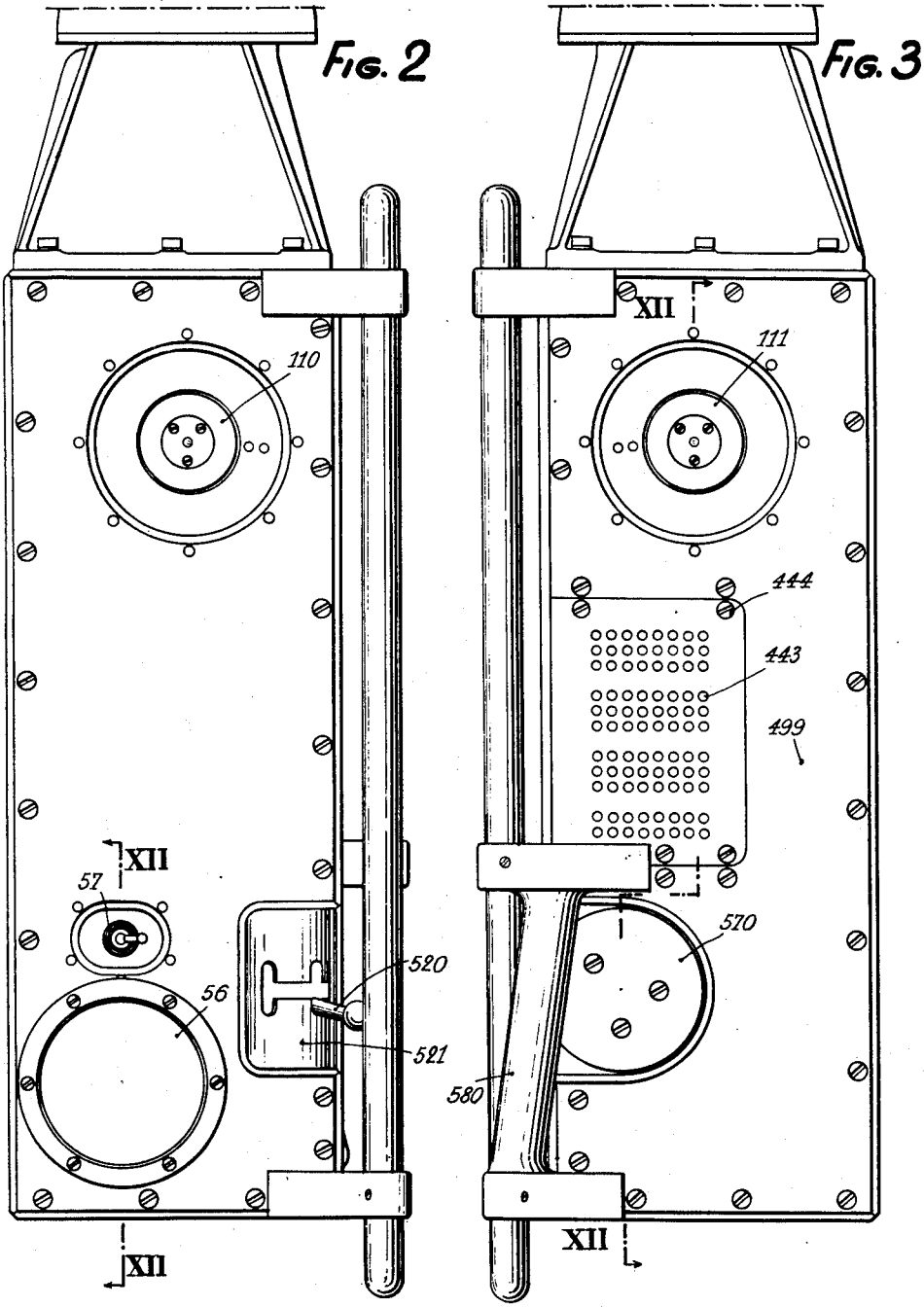

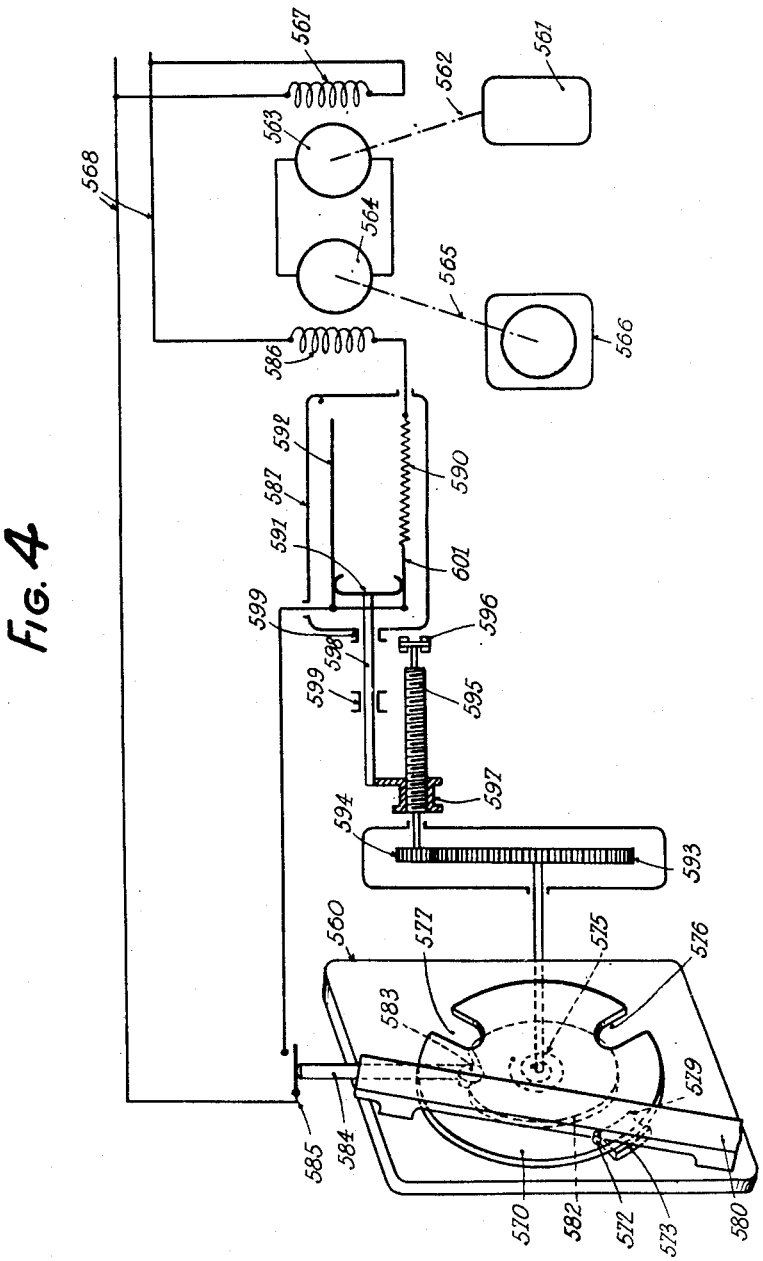

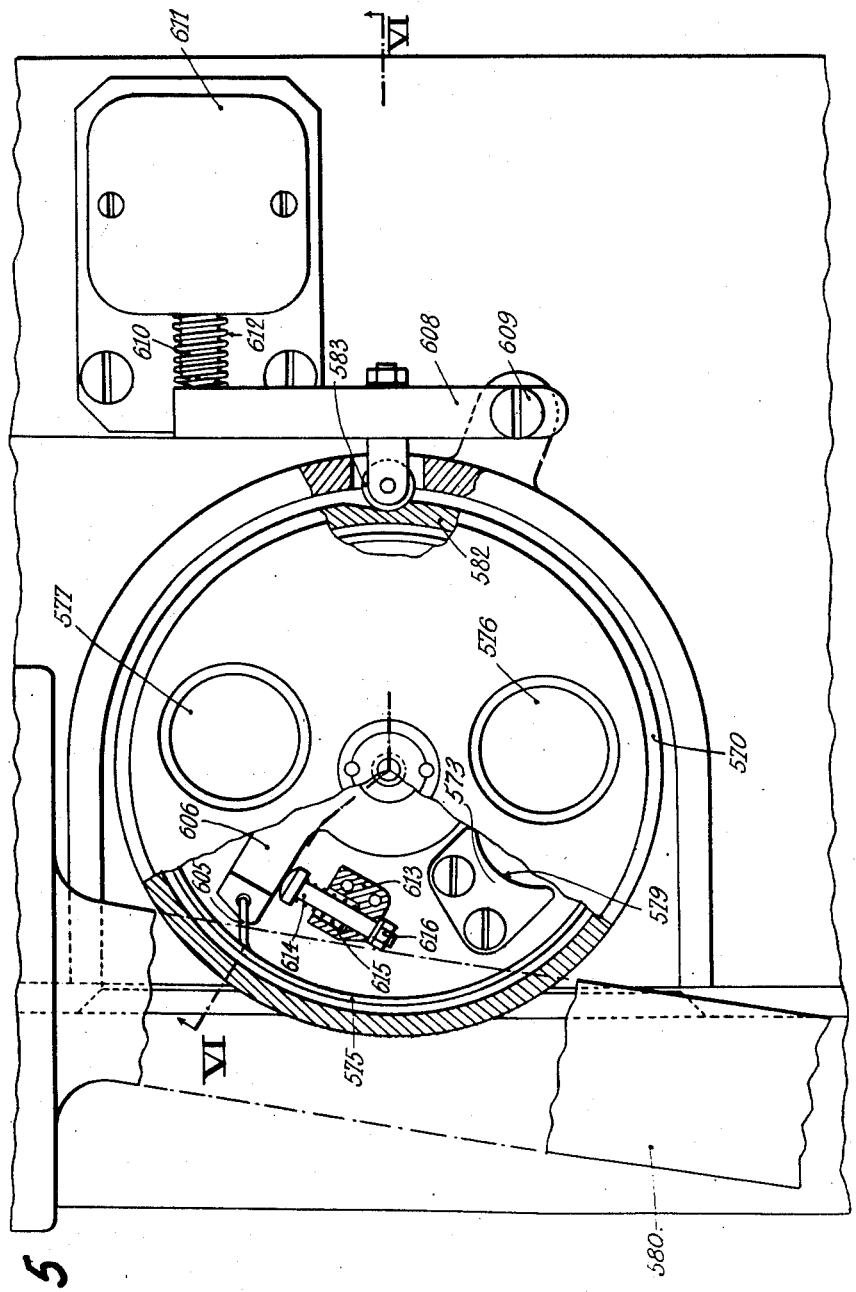

May 4, 1954

C. W. BERTHIEZ 2,677,284

MANUALLY OPERABLE SPEED CONTROL FOR MACHINE TOOLS OR THE LIKE

Original Filed April 7, 1948

INVENTOR
Charles William Berthiez

By George H Corey

ATTORNEY

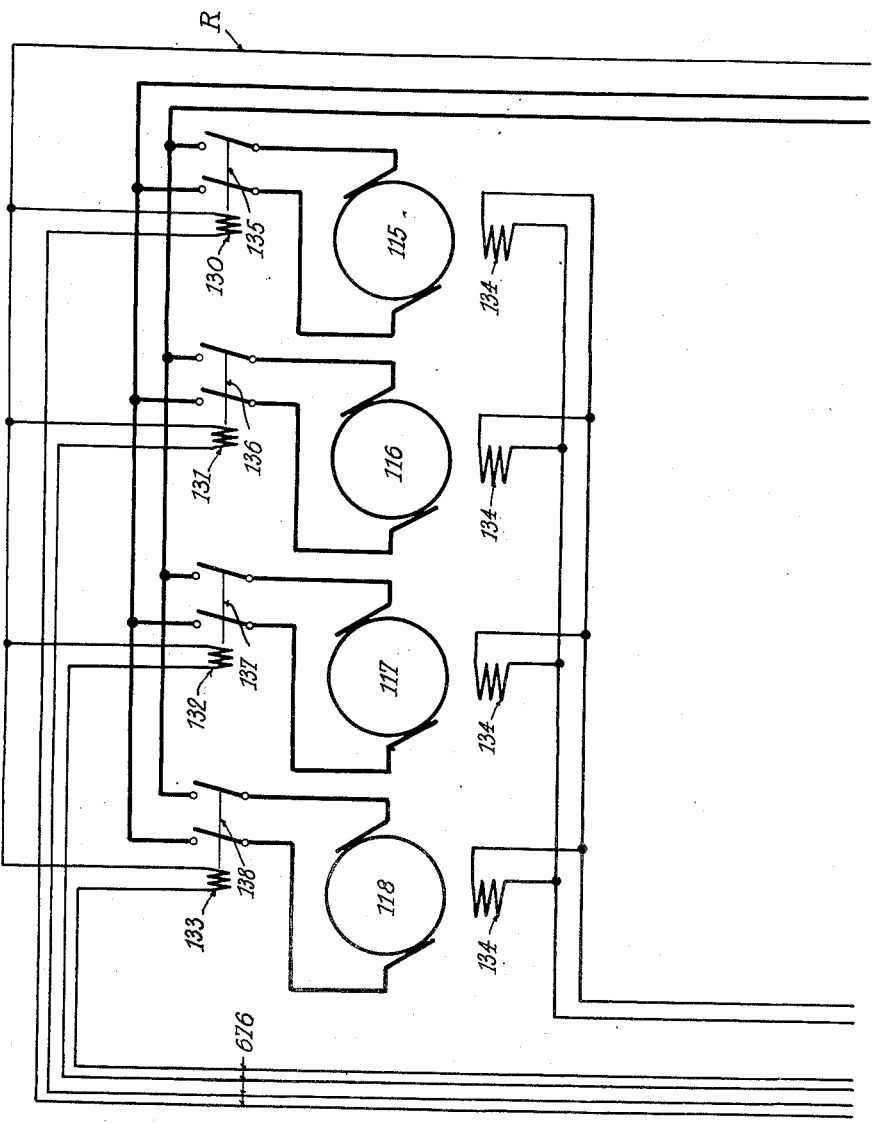

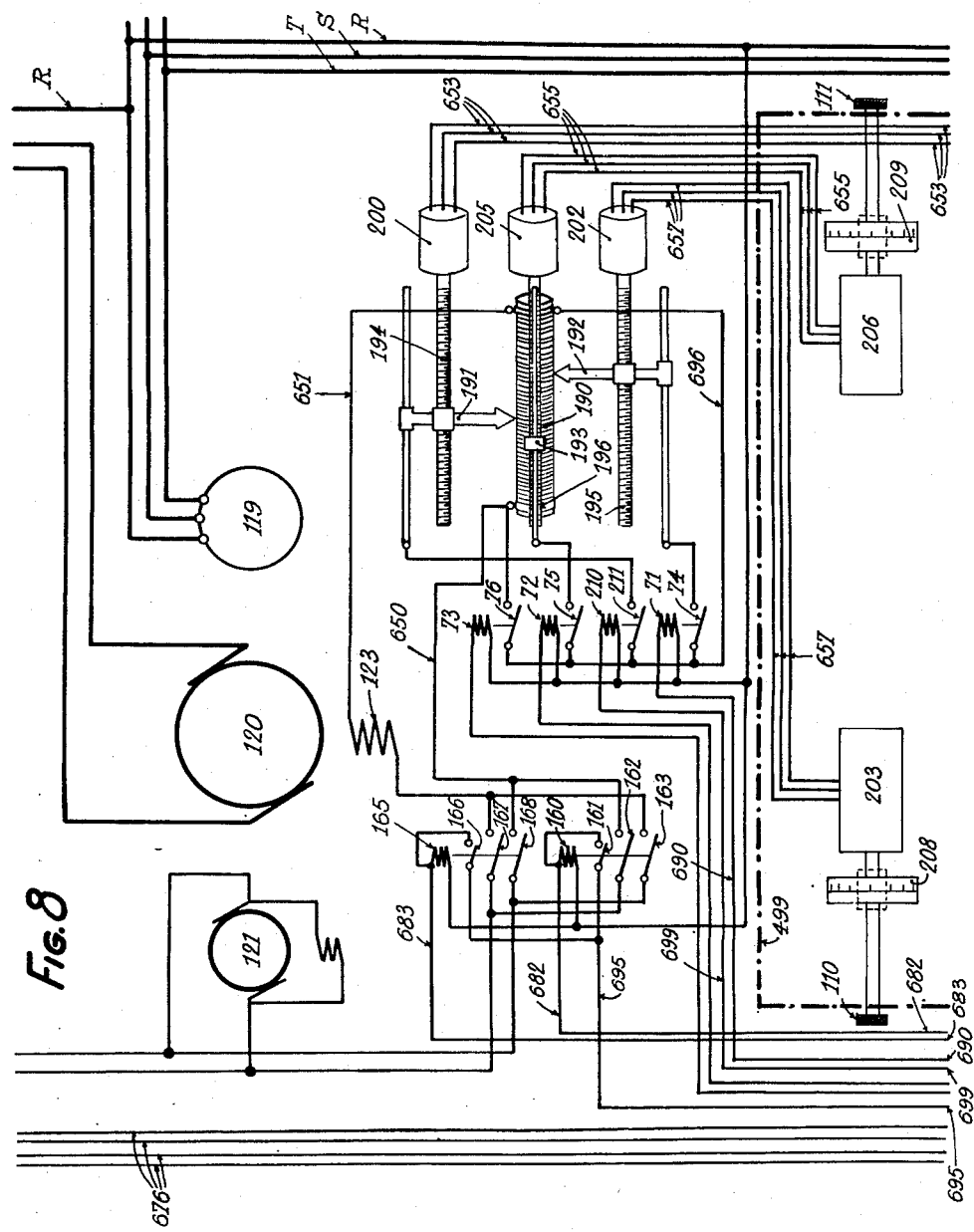

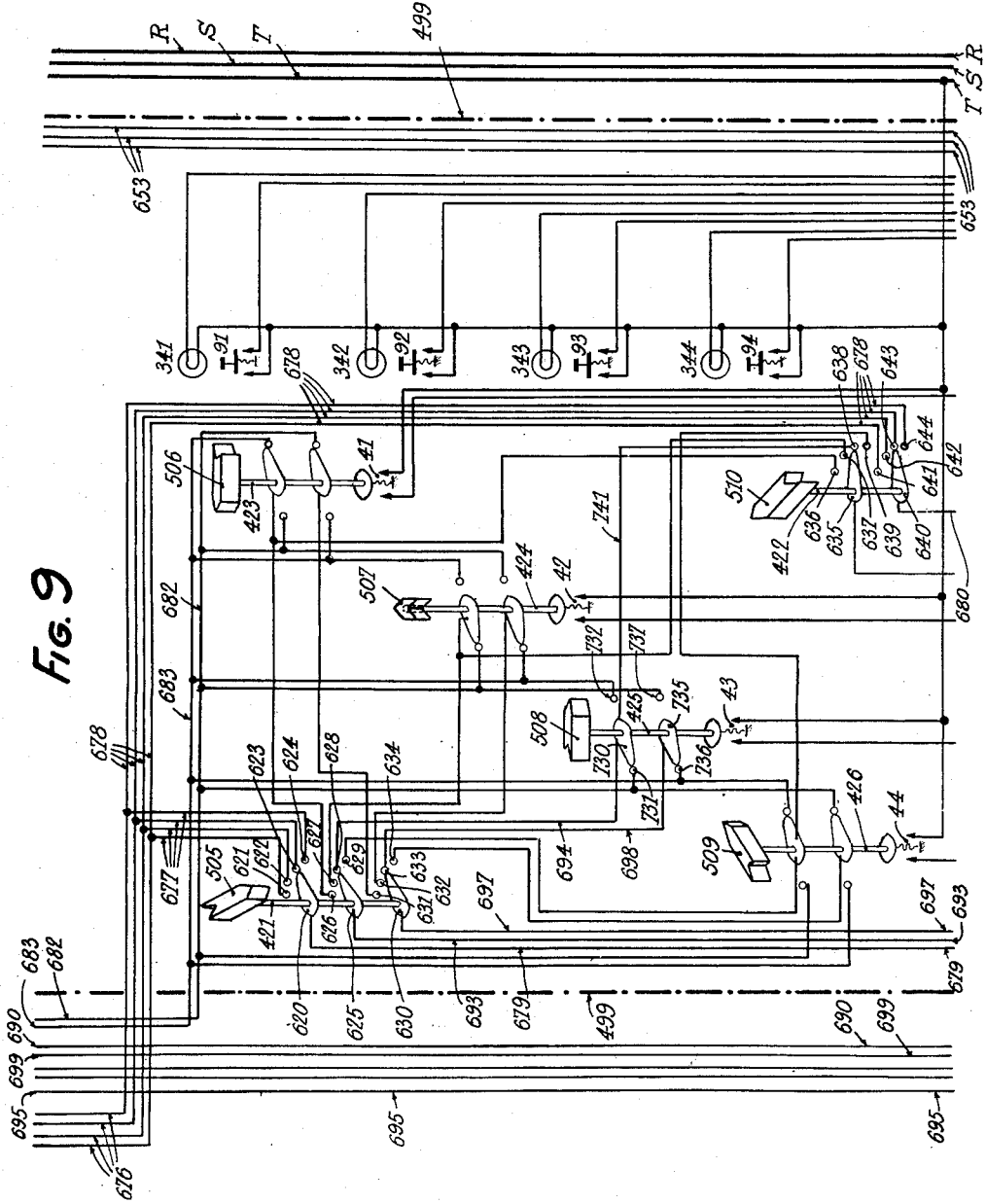

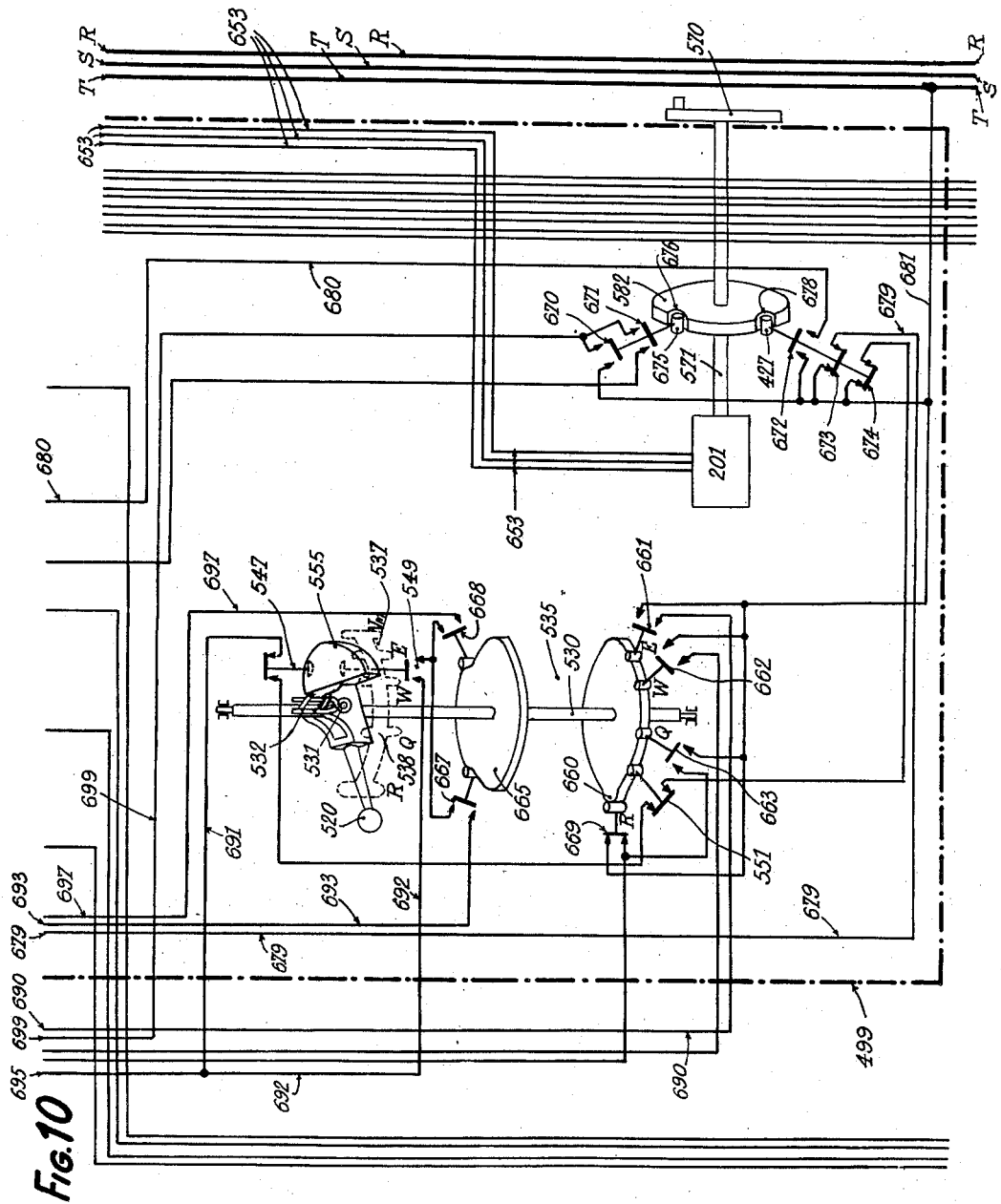

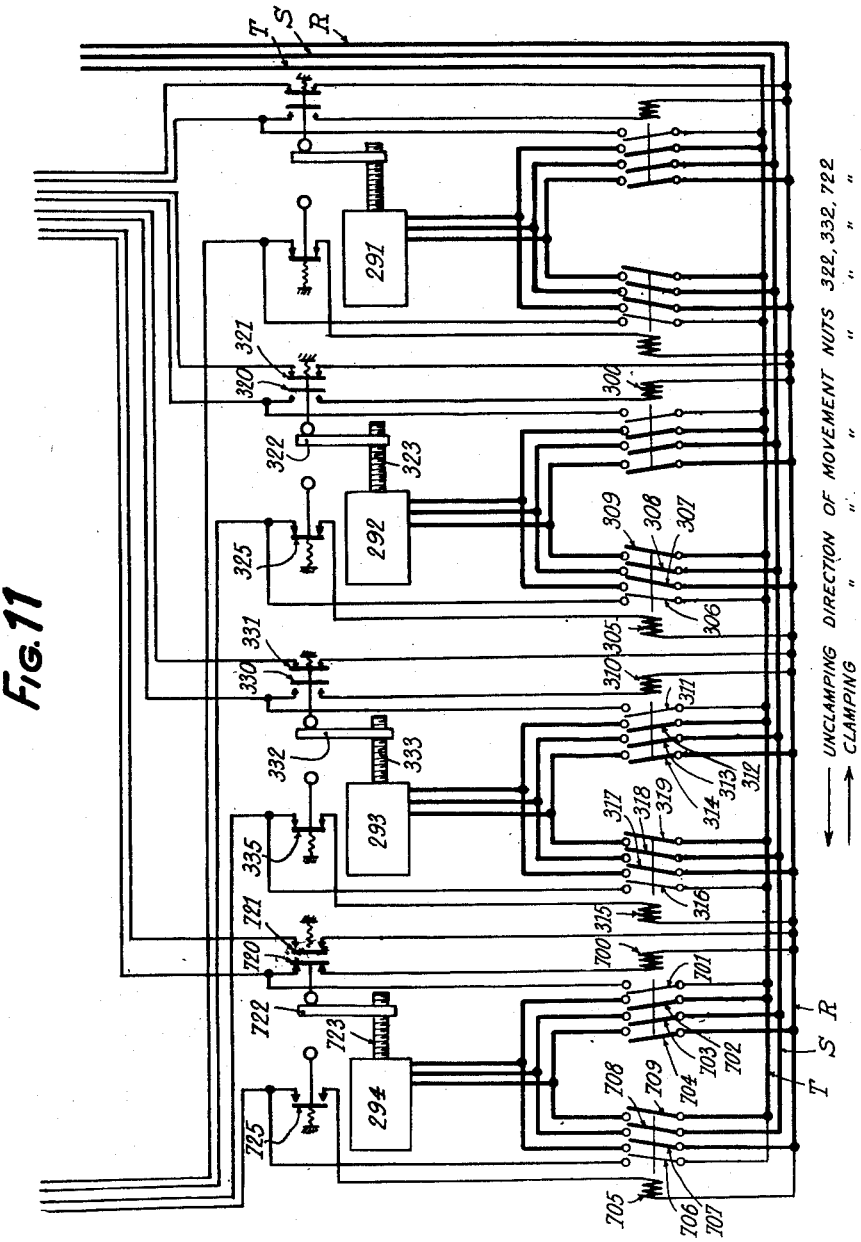

May 4, 1954  C. W. BERTHIEZ  2,677,284
MANUALLY OPERABLE SPEED CONTROL FOR MACHINE TOOLS OR THE LIKE
Original Filed April 7, 1948  11 Sheets-Sheet 11
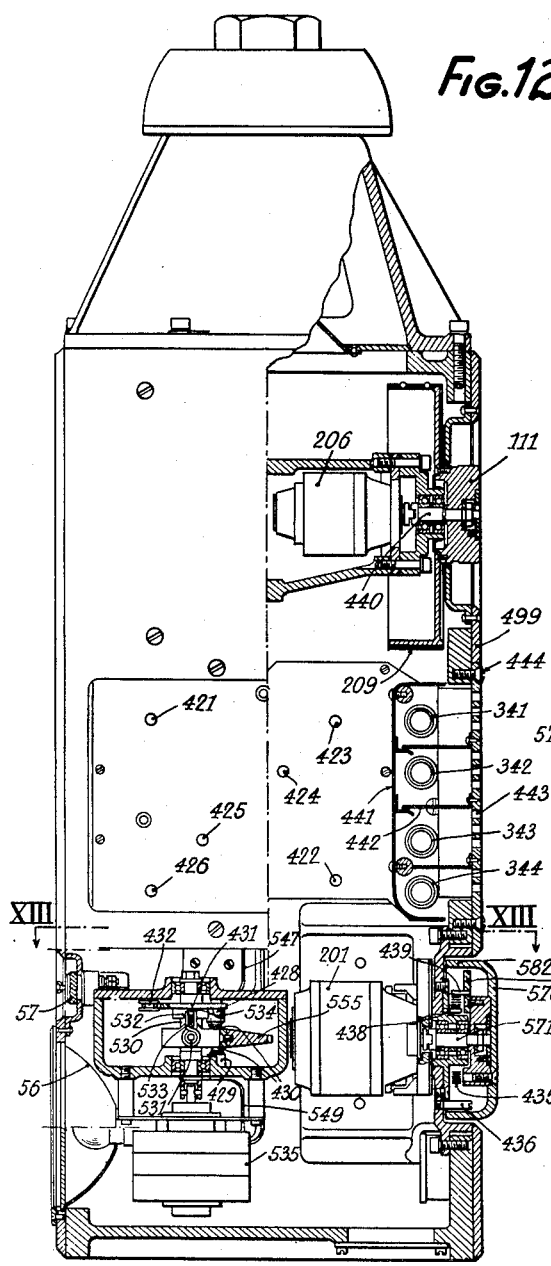
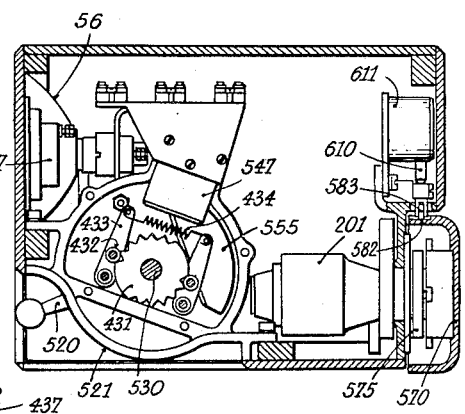
INVENTOR
Charles William Berthiez
By George H. Corey
ATTORNEY Patented May 4, 1954

2,677,284

UNITED STATES PATENT OFFICE 2,677,284

MANUALLY OPERABLE SPEED CONTROL FOR MACHINE TOOLS OR THE LIKE

Charles William Berthiez, Paris, France

Original application April 7, 1948, Serial No. 19,454. Divided and this application January 26, 1950, Serial No. 140,658

Claims priority, application France October 22, 1945

7 Claims. (Cl. 74—471)

This invention relates to apparatus for controlling the operation of machine tools, hoisting apparatus and the like. The invention more particularly relates to control panels or control boxes or the like associated with apparatus and devices for effecting control of the movable members of such machines, especially when such movable members are driven by electric motors.

It has been proposed heretofore to control movement of a movable member of a machine by so-called remote control from a given station. For this purpose electric control circuits have been utilized provided with relays controlled by contacts actuated by push buttons or other devices located at the station for energizing or de-energizing the relays, these relays being effective to initiate and to control the energization and speed of a suitable motor connected to the member to be moved for effecting the desired movement thereof. More recently it has been proposed in connection with the operation of machine tools to mount the control push buttons on a control box or control panel suitably supported for movement about the machine to be operated so that the operator of the machine may carry out the controls from a position more conveniently located with respect to the member of the machine to be moved and the function which it performs than is possible when a control box or panel is located in fixed relation to the machine at a given station. Such portable control boxes or panels of the prior art may have the advantage of convenience in carrying out the control operation and of making possible closer inspection of the operation to insure greater accuracy of the machine operation and less physical fatigue of the operator in not being required to move frequently about the machine, especially in the operation of large machine tools or the like, and other advantages. Nevertheless, with the control devices heretofore proposed, by virtue of the fact that the large number of push buttons and other elements required to be actuated by the operator have been assembled in close relation in order to limit the size of the control panel or box, careful attention to the control panel is required, whether it be on a portable box or one stationary at a given station, in order that the operator may know what buttons or other elements are to be or have been actuated and, therefore, what members of the machine are to be controlled or are conditioned for control and for movement thereof. Such careful attention to the panel or box and the control elements carried thereby to distinguish with certainty one element from the other detracts from the attention required to be given to the machine itself, the member thereof to be moved, the tool carried by such a movable member and the work piece upon which it is desired that such tool shall operate. Moreover, in the devices of the prior art where a substantial number of members of the machine are required to be moved each in a plurality of directions, as in a machine tool, the number of the control elements required to be operated has been so large that the number of selections to be made complicates seriously the operations necessary to carry out the control and increases greatly the attention required of the operator for this purpose.

It is an object of the invention to provide the control box with "manual" means for controlling the speed of movement of the member of the machine which has been selected for movement and for varying this speed at will throughout the range of speeds available for driving the selected member. Automatic means for controlling the speed of movement of the selected member of the machine are also associated with said "manual" means and interlocking means are also provided for preventing the operation of the "automatic" control above referred to when controlling the movement of the movable member of the machine from the control box by means of this control device for securing variations of the speed at will.

Other objects and features of the invention will appear from the following description taken in connection with the drawings which show one embodiment of a control system including a control box. Moreover, certain structural features of the control boxes which constitute improvements upon the prior art devices will be understood from the description to be given in connection with these drawings in which:

Figs. 2 and 3 are side elevation views of the movable control box shown in Fig. 1;

Fig. 4 is a diagrammatic representation of one embodiment of a manual control device for controlling the movement of a movable member of a machine;

Fig. 5 is an external view in elevation of the manual control device shown in Fig. 4 with certain parts broken away and other parts shown in section;

Figs. 7, 8, 9, 10 and 11 inclusive taken together show a wiring diagram corresponding to the embodiment of the invention shown in Figs. 1 to 13 inclusive;

Fig. 12 in the left hand part is a section on line

XII—XII of Fig. 2 and in the right-hand part is a section on line XII—XII of Fig. 3;

Fig 13 is a horizontal section on line XIII—XIII in Fig. 12 with certain parts omitted.

Figure 1:
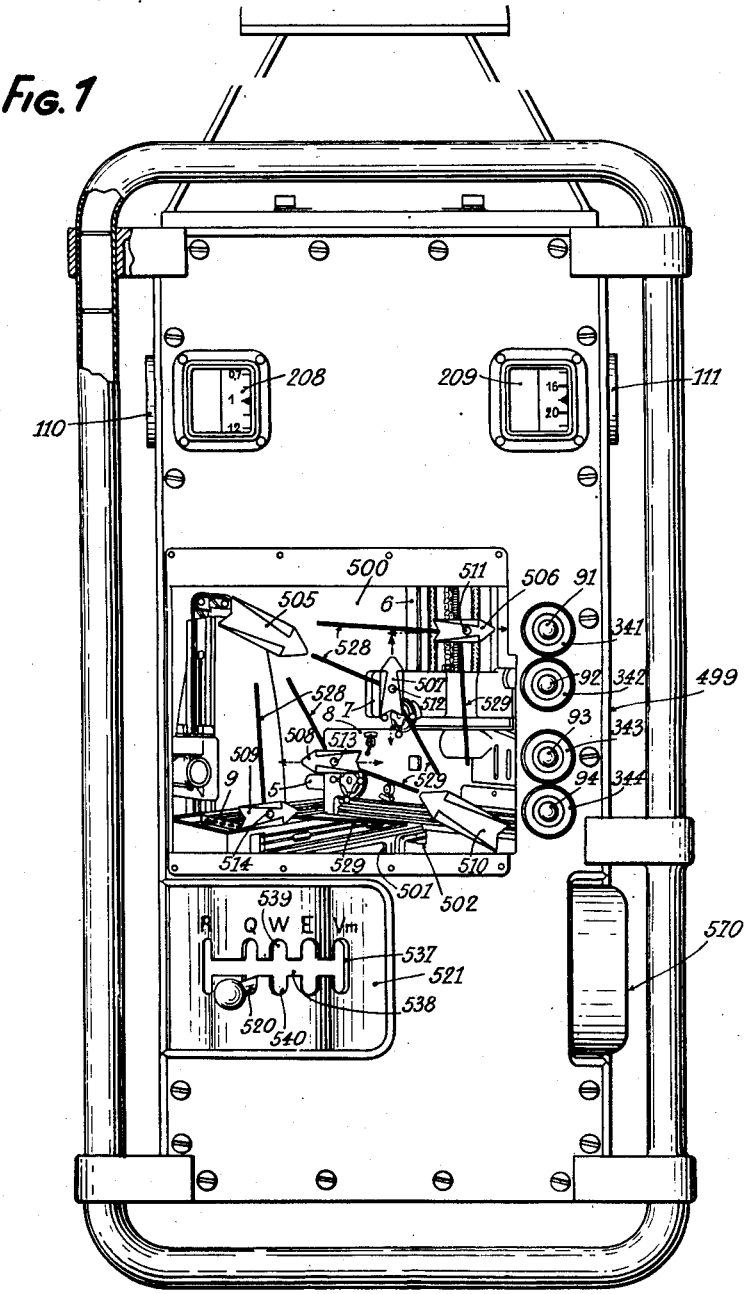
Fig. 1 is a front view of a movable control box according to one embodiment of the invention.

I will now describe one embodiment of my invention as illustrated in Figs. 1 to 13. The device shown in these figures is constituted by an improved pendant control box which can be used in connection with a machine tool such as a boring and milling machine as depicted on the front face thereof as shown in Fig. 1. However, the improved control box of this embodiment may be used in connection with other types of machines.

The pendant control shown in elevation in Figs. 1 to 3 comprises a box 499, preferably a light metal alloy casting.

On the front of the box a panel or plate 500 is supported on which is engraved a pictorial representation of the boring and milling machine and carrying two member selector elements 505 and 510 respectively for "automatic" operation and for manual or "trigger" operation for selecting the member of the machine to be moved and four direction selector elements 506, 507, 508, 509. These direction selectors respectively are associated with the depicted movable members, that is with the column 6 of the boring and milling machine, the carriage 7 vertically movable thereon, the headstock 8 horizontally movable on the carriage 7 and the table 9 horizontally movable transversely of the headstock and column movements. These direction selectors respectively carry unclamping buttons 511, 512, 513, 514 for controlling unclamping of the movable members of the machine depicted on the panel with which respectively the direction indicators are associated. Four clamping buttons 91, 92, 93, 94 are provided for clamping the movable members, these buttons being positioned at the same level as the respective direction selectors and being provided with translucent rings which are illuminated by lamps 341, 342, 343, 344 when the corresponding movable members with the depiction of which the direction selector is associated is clamped. Control lever 520 as shown in Figs. 1, 2 and 13 projects through an arcuate portion of the wall 521 of the box for selecting the speed of the movable member of the machine selected by means of the "automatic" operation selector element 505. This arcuate wall provides a grid having vertical notches intersecting a horizontal slot for starting and stopping the movement of said member and for determining the speeds thereof and for determining the "quick return" movement. Two speed indicators 208 and 209 for indicating the "engagement" and "working" speed respectively are carried on this portable control box.

In the wall of the box 499 on the right hand side thereof as viewed in Fig. 1 is arranged near the bottom the manually operable element 570 of a control device for progressively adjusting the speed of the movable member selected by means of the manual or "trigger" operation selector element 510 and for starting and stopping the movement of such member.

At the level of the indicator 209 at this right hand side a knob 111 for controlling the "working" speed is carried on the shaft extension of the drum of indicator 209 and the transmitter 206. At the left hand side of the box 499 is arranged at the level of the indicator 208 a knob 110 carried on the shaft extension of the drum indicator 208 and transmitter 203 for controlling the "engagement" speed.

Adjacent the bottom on this left side face a lighting device 56 and its switch 57 are arranged which allows the operator to light up the area where the tool is working.

I will now describe the different elements carried by the box 499 which are associated with or cooperate with panel 500, control lever 520 and more particularly manually operable element 570.

The panel 500 shows as a pictorial representation of the principal members of a boring and milling machine. These members are respectively the bed 501 on which a table 9 may slide either forward or reversely in the directions corresponding to the arrows f1 and f2, the frame or support 502 along which the upright or column 6 may move as shown by the arrows f3 and f4, the saddle or carriage 7 adapted to slide up and down the upright 6 as shown by the arrows f5 and f6, the headstock 8 adapted to move horizontally along the saddle 7 as shown by the arrows f7 and f8 and lastly the tool-carrying spindle 5 mounted in the headstock 8. The work piece to be machined is secured to the table 9.

On the part of the pictorial representation illustrating the table 9 is located the direction selector or switch 509, the arrow-shaped handle of which may assume two positions, namely the position illlustrated in the drawing when it points to the direction of the arrow f2 and the diametrically opposed position pointing to the direction of the arrow f1. The handle of this switch may be "positioned" and maintained in either of these two positions by any conventional arrangement.

Similarly, on the part of the pictorial representation illustrating the headstock 8 is located the direction selector or switch 508 the arrow-shaped handle of which may also assume two positions, that illustrated in the drawing corresponding to the direction of the arrow f7 and the opposite direction corresponding to the arrow f8.

Two other similar direction selector switches 507 and 506 are similarly adapted to be "positioned" to indicate respectively the movements of the saddle or carriage 7 and of the upright 6 as shown by arrows f5, f6 and f3, f4.

These four direction switches 509, 508, 507 and 506 thus are supported on axes perpendicular to the face of panel 500 and respectively are operable for selecting the directions of the movement of the movable members of the machine, that is the table, the headstock on the saddle, the saddle on the upright and the upright on its support, upon which as they are depicted on the panel these direction selectors respectively are located. Moreover, the locations of these direction selectors on the panel are angularly spaced with respect to each other about the locations on the panel of both the member selector 505 and the member selector 510.

The selector element or switch 505 also is provided with an arrow shaped handle and is pivotally supported on an axis perpendicular to the face of the panel 500 for rotation to four different positions for selecting one of the four members to be moved which have been mentioned hereinabove. A conventional "positioning" device allows the switch 505 to be "positioned" in any of the four positions illustrated in Fig. 1. The cam 527 of this device is provided with four notches into each of which the rollers 516 may enter under the bias of spring 519. To select a member to be moved the tip of the arrow-shaped handle of said switch 505 is pointed towards the direction switch 509, 506, 508, 507 located on the diagrammatical representation of the movable members, that is, the table, the upright, the headstock and the carriage. On the pictorial representation converging lines 528 are drawn showing more clearly the four positions that may be assumed by the switch handle 505.

The movable member selector or switch 510 also is supported for pivotal movement on an axis perpendicular to the face of panel 500 to four different positions with the arrow-shaped handle thereof pointing to the location of the particular direction selector 506, 507, 508, 509 associated with the depicted movable member to be moved. The part played by said switch and its structure is similar to that of the switch 505, so that this switch 510 may be selectively "positioned" in the four different positions pointing along the convergent lines 529 which serve the same purpose as lines 528 of the switch 505.

The position of each of the direction controlling switches 509, 508, 507, 506 is completely independent of the position of any of the three others and is also completely independent of the position given to the two movement selecting switches 505 and 510 which, in their turn, are completely independent of one another. Any of these selectors may be operated, therefore, or its position changed regardless of the position occupied by the other to accomplish the desired direction of movement of the desired member to be moved, whether by "automatic" or "manual" operation.

In connection with Fig. 1 I have described the switches 506, 507, 508 and 509 as respectively constructed with push buttons 511, 512, 513 and 514 thereon for control of the unclamping of the member selected to be moved. In connection with the wiring diagram of Figs. 7 to 11 inclusive a modified form of these direction selectors 506, 507, 508, 509 will be described in which the arrow handle thereof itself may be pushed in the direction along the pivotal axis for effecting unclamping.

With either form of direction selector in the above described selecting device it is possible to pass very easily from "automatic" operation to "manual" operation and from the movement of one member in a predetermined direction to the movement of another member in any desired direction.

The selection may be executed as a preliminary operation i. e. the choice of the member to be controlled and the choice of the direction in which it is to be moved may be carried out before starting the machine or else, on the other hand, such selection may be carried out while the machine is already running.

I will now describe the control device having the manually operable element 570 carried by the control box 499 shown in Figs. 1 to 3. This device is illustrated in greater detail in Figs. 4 to 6 inclusive.

With reference first to Fig. 4, this figure is a diagrammatic view of the control device associated with the motor driving only one movable member of the machine-tool.

In this Fig. 4 the rectangle 560 designates in a general manner a part of a face of the control box for controlling a movable member 561 of the machine tool through a suitable drive 562 by an electric motor 563 forming part of a Leonard group illustrated diagrammatically in the drawing in which motor 563 is fed by the generator 564 which is driven through shaft 565 by the motor 566 at constant speed. The field windings 567 of the motor 563 are fed under constant voltage from a direct current supply 568.

The control box 560 carries a rotatable disk 570 of circular shape secured to a spindle 571 adapted to rotate in a suitable bearing supported on box 560. To the disk 570 is secured a pin 572 adapted to come into contact with a stop 573 rigid with the control box 560 for preventing the disk 570 from rotating counterclockwise beyond a predetermined position. A spiral spring 575 one end of which is secured to the control box 560 and the other end to the disk 570 urges the disk, to rotate until the pin 572 engages stop 573.

The disk 570 is provided with two notches 576 and 577 provided at its periphery and arranged in a manner such that when the finger of the operator's hand has engaged one of them it may be possible to rotate the disk clockwise until the finger abuts against the surface 579 of the stop 573 or of any other suitably located stop, thus determining the rotational movement of the disk 570 from the position with the pin 572 engaging stop 573 against the spiral spring 575.

A handle 580 is secured to the control box 560 itself in the vicinity of the disk 570 in a position such that when the operator grasps this handle 580 with his hand he may operate the disk 570 with the forefinger of the same hand after the manner of the trigger of a revolver.

A cam 582 rigid with the disk 570 cooperates with a roller 583 mounted at the lower end of a follower rod 584 the upper end of which engages the movable contact of an electric switch at 585 inserted in series in an electric circuit including the field windings 586 of the generator 564 and a rheostat shown generally at 587, this circuit being fed from the supply 568.

The rheostat includes a resistance 590 over which may slide a slider 591 also contacting with a bar 592 one end of which is connected to the resistance 590 so as to short circuit a greater or less proportion of the resistance 590 according to the position occupied by the slider 591.

The slider 591 is operatively connected to the disk 570 through a suitable transmission which may be, for example, a mechanical transmission of the type illustrated diagrammatically in Fig. 4 and constituted by gearing 593, 594 driving a worm 595 prevented from moving axially by a double thrust bearing 596. On this worm a nut 597 is threaded connected by rod 598 to drive the slider 591 along the rheostat as the nut 597 progresses longitudinally along the axis of the worm 595, the rod 598 being adapted to slide between guide members 599 for preventing any rotation of the nut 597. The gearing element 593 is connected mechanically with the rotary shaft 571 carrying the disk 570 while the gearing element 594 is connected mechanically with the worm 595.

The operation of the arrangement just described is as follows:

Supposing the motor 563 and consequently the machine member 561 are at a standstill, i. e. the switch 585 is open and the field winding 586 of the generator 564 is not energized. If it is desired to make the motor 563 rotate at a low speed, the operator grasps the handle 580 and engages his forefinger into the first notch 576 of the disk 570 for driving same clockwise with the result that the cam 582 rotates, causing the raising of the follower rod 584 which closes the switch 585. The field winding 586 of the generator thereby is connected with the supply 568 through the agency of the rheostat 587. If the motor 566 is rotated so as to drive the rotor of the generator 564, the latter feeds current to the motor 563 which starts rotating at a speed corresponding to the voltage of the generator, that is, at minimum speed at the slider 591 is still on the extreme left hand side of the rheostat and consequently short circuits no part of the resistance 590.

If the disk 570 is turned further, the simultaneous rotation of the worm 595 moves the slider towards the right over the resistance 590. This results in short circuiting a part of this resistance and consequently increases the energizing current in the field winding 586 of the generator 564. The voltage of the latter increases and, therefore, the speed of the motor 563 and of the machine member 561 driven thereby also increases.

The forefinger of the operator which rotates the disk 570 soon reaches the stop surface 579 of the stop 573. At this point it is no longer possible to rotate the disk 570 any further and the speed cannot be further increased by using notch 576. Thus by this arrangement, the machine member 561 may be moved at a reduced speed even if, for any cause whatever such as too great a haste or lack of sensitivity, there is exerted on the disk a relatively considerable pressure which otherwise would rotate the disk so far as to exceed the desired low speed.

On the other hand, if it is desired to impart a higher speed to machine member 561, the notch 577 can be used instead of the notch 576. It is apparent that it is possible then to impart to the disk 570 a rotation of a much greater amplitude before the forefinger of the operator abuts against the stop 579. During this rotation the worm 595 will also rotate and move the slider 591 towards the right so as to short circuit a greater fraction of the resistance 590 than with notch 576. This will lead to an increase in the generator field and an increase in the speed of the motor 563 to an attained speed greater than was attained with notch 576.

The maximum possible speed is obtained when the forefinger of the operator abuts against the stop 579.

It will be apparent that according to the position of the notches 576 and 577 on the disk it is possible to adjust the extent of these two ranges of speeds. It may be desirable for instance in certain cases to provide for the use of the notch 576 to allow the starting of the motor and maintaining it at reduced speed without increasing this speed as long as the device is operated with the finger on notch 576. In such cases it will be of advantage to engage the slider 591 on bar 601 before this slider engages the resistance 590 itself so that all of the resistance may still be in circuit when the forefinger of the operator engaging the notch 576 abuts against the stop 579.

Figure 6:
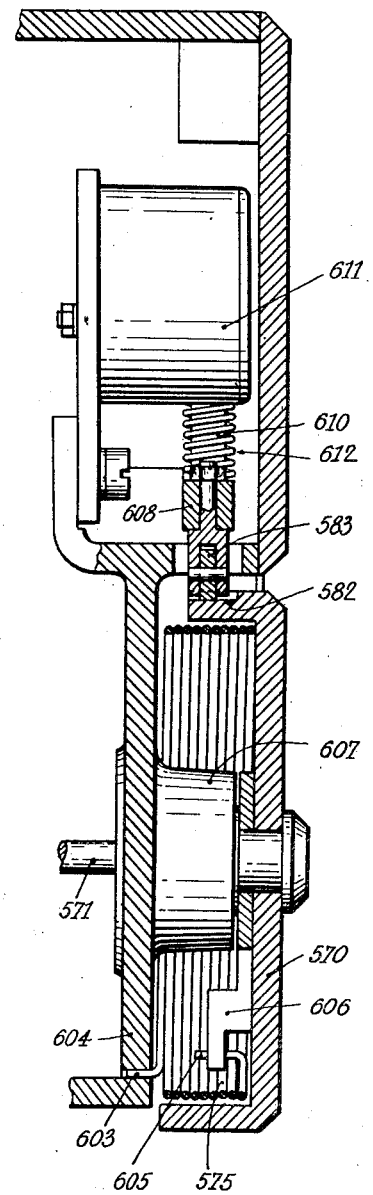
Fig. 6 is a section on line VI—VI of Fig. 5.

In Figs. 5 and 6 I have illustrated an embodiment of the arrangement hereinabove generally described with reference to Fig. 4.

The same elements are found again such as the disk 570, the handle 580, the stop 579, the cam 582, the bias spring 575. The notches 576 and 577 are replaced by two openings 576, 577 in Fig. 5 so as to prevent the forefinger of the operator from being hindered by the bias spring 575. This spring is carried inside the disk 570 as shown in Fig. 6. One end of this spring is secured at 603, Fig. 6, to the inner wall 604 of the control box 569 and its other end engages at 605 a member 606 rigid with the disk 570. The disk is rigidly secured to its spindle 571 rotating inside a bearing 607 carried by the inner wall 604 of the control box 569. This spindle 571 is connected with the arrangement for varying the speed of the controlled member through any suitable transmission means an example of which has been given with reference to Fig. 4.

The cam 582 acts on a roller 583 carried by a lever 608 pivotally secured at 609 to the control box and cooperating with the rod 610 of an electric switch illustrated merely by its casing 611 fastened to the wall of the control box.

A spring 612 provides for maintaining contact between the roller 583 and the cam 582.

In the embodiment of Figs. 5, 6 the rigid stop 573 of Fig. 4 has been replaced by a resilient stop constituted by a block 613 secured to the control box wall and carrying a pin 614 slidable therein and urged upwardly in Fig. 5 by a spring 615 acting against the head of pin 614. The stroke of this pin 614 is limited by a nut 616 screwed on the lower end of the pin. The arm of member 606 to which is secured one end of the spring 575 and which is rigid with the disk 570 abuts against the pin 614 at the end of the return movement of the disk when it has been released by the finger.

It is obvious that the disk 570 instead of including only two notches or openings 576 and 577 may include more than two if it is desired to select more than two ranges of speed.

Having described the different elements of the pendant control box shown in Figs. 1 to 6 inclusive, I will now describe the operation of the control 499 with reference to the wiring diagram of Figs. 7 to 11 inclusive which shows the electrical circuits connecting the several elements together and with the feed motors 115, 116, 117, 118 and with the clamping motors 291, 292, 293, 294 of the movable members of a machine tool such as a boring and milling machine.

In Fig. 7 the four feed motors are energized through a Leonard group which is controlled by the rheostat 190, Fig. 8.

It should also be observed that the motor 563 of Fig. 4 is any one among these four feed motors 115, 116, 117, 118 and that the generator 564 and the driving motor 566 represent respectively the generator 120 and the driving motor 119 in Figs. 7 and 8.

The motors providing for shifting the upright 6, carriage 7, headstock 8 and table 9 of the machine which are indicated by the reference numbers 115, 116, 117 and 118 respectively have their armature windings connected in parallel to the armature of the generator 120 through the double pole contacts 135, 136, 137, 138 respectively of relays 130, 131, 132, 133.

The rotational direction of these motors 115, 116, 117, 118 is controlled by direction selecting switches 506, 507, 508, 509 respectively, as described in connection with Fig. 1, through circuits described hereafter. These switches are provided with shafts 423, 424, 425 and 426 carrying contact arms such as 730 and 735 (for switch 508). The selection of the feed motor 115, 116, 117, 118 to be energized is accomplished by means of member selecting switches 505 for the "automatic" feed movement and 510 for the "manually" controlled feed movement secured by means of the control disk 570, Figs. 4, 5, 6. The switch or selector 505 is provided with a shaft 421 carrying three contact arms 620, 625, 630 cooperating with three sets of studs 621, 622, 623, 624 for the arm 620, 626, 627, 628, 629 for the arm 625, 631, 632, 633, 634 for the arm 630. The four studs of each set are positioned so as to be engaged by the respective arms when the member selector 505 is respectively set to select the member to be moved. The switch or selector 510 is provided with a shaft 422 carrying two contact arms 635 and 640 cooperating with two sets of studs 636, 637, 638, 639 for the arm 635 and 641, 642, 643, 644 for the arm 640.

The speed of the motors 115, 116, 117, 118 is adjusted by means of the rheostat 190 having three sliders 191, 193 and 192. The slider 191 is adapted for controlling the feed speeds through the manual control disk 570, slider 193 for adjusting the so-called "working" feed speed and slider 192 for the so-called "engagement" speed feed.

The rheostat 190 is arranged in the energizing circuit of the field winding 123 of the generator 120 from the exciter armature 121 through a circuit comprising for the rotational direction called "forward direction" field winding 123, contact 163 of forward direction relay 160, armature winding of exciter 121, contact 162 of relay 160, wire 650, rheostat 190 and wire 651 again to field winding 123. For the reverse rotational direction the circuit comprises field winding 123, contact 167 of reverse relay 165, armature winding of exciter 121, contact 168 of relay 165, wire 650, rheostat 190, wire 651 again to the field winding 123.

In this second circuit the excitation current of the generator 120 is caused to flow in the reverse direction with respect to the first circuit. The generator armature current is thus reversed and the motors 115, 116, 117, 118 energized from this generator will then rotate in the opposite direction.

The forward and reverse relays 160 and 165 respectively have holding contacts 161 and 166. The energizing circuits of these two relays will be explained hereinafter.

When the entire resistance of rheostat 190 is inserted into the generator field winding circuit this generator which is caused to rotate at a constant speed thereby delivers its minimum voltage so that the motors 115, 116, 117, 118 will rotate at their lowest speed.

To set up the "engagement" speed, slider 192 is put into operation, that is, that portion of the rheostat 190 which is located at the right of the slider 192 in Fig. 8 is short circuited when contact 74 of relay 71 is closed upon energizing relay 71.

The "working" speed is obtained by connecting the slider 193 in the circuit by energizing the relay 72 operating the contact 75 to short circuit that portion of the rheostat which is located at the right of the slider 193 in Fig. 8.

Further, the "fast" speed is obtained by short circuiting the whole rheostat 190 by energizing relay 73 to close its contact 76.

The "manually controlled" feed speed is obtained when the control disk 570 is used through positioning according to the position of the disk 570 the slider 191 on rheostat 190, this slider being connected in circuit when contact 211 of relay 210 is closed upon energization of relay 210.

The adjustment of the respective positions of the sliders on the rheostat may be remotely controlled through "telerotators" or receiver motors 200, 205, 202, e. g. of the Selsyn synchronously controlled type. Thus the manually controlled slider 191 is actuated by rotating the screw 194 driven by the receiver 200 connected by wires 653 to the transmitter 201 on the shaft 571 on which control disk 570 is fastened. Movement of slider 193 takes place through rotating the screw 196 driven by the receiver 205 connected through wires 655 to the transmitter 206 on the shaft of which is fastened the operating knob 111. On this shaft also is mounted the graduated drum 209 for directly indicating the selected "working" speed as described in connection with Figs. 1 to 3. Slider 192 is adjusted by means of the screw 195 rotationally driven by the receiver 202 connected through wires 657 to the transmitter 203 on the shaft of which is fastened the operating knob 110. The graduated drum 208 also is mounted on this shaft and shows directly the corresponding "engagement" speed as described in connection with Figs. 1 to 3.

The "automatic" operation at "minimum" speed, "engagement" speed, "working" speed, "fast" speed and "quick return" speed is accomplished by actuating the lever 520 pivotally connected to the vertical shaft 530, Fig. 10. This lever may be moved in the grid 537 shown in dotted lines in Fig. 10 in two directions, namely, horizontally in the slot 538 about the vertical axis of shaft 530 and vertically about the pivotal axis 531 when the lever is so positioned as to register with one of the notches designated by Vm, E, W, Q and R which correspond to the above mentioned feed speeds respectively. The operation of this device is described in my application Serial No. 207,747, filed January 25, 1951.

The control member for "manually controlling" the feed motion is the disk 570 which, as indicated hereinabove, is mounted on the shaft 571 of transmitter 201 for adjusting the position of slider 191 on rheostat 190. The shaft 571 also is connected with the cam 582, Fig. 10, adapted to operate switches 670, 671, 672, 673 and 674. This cam 582 is shown in the position corresponding to the neutral position of the disk 570 in which the front contacts 670, 671 and 672 are opened while the back contacts 673 and 674 are closed. The contacts 670, 671 are carried by cam follower 675 engaged on notch 676. Contacts 672, 673, 674 are carried by cam follower 427 engaged on notch 678. Immediately after the disk has been moved from its neutral position so that cam followers 675, 427 are forced outwardly by the cam 582 the front contacts 670, 671, 672 which were open will be closed and back contacts 673, 674, will be opened.

The contactors 130, 131, 132 and 133 for the four feed motors are connected respectively to the contact studs 621, 622, 623, 624 for contact arm 620 of the member selector 505 (automatic operation) by means of wires 676 and 677 and respectively to the contact studs 641, 642, 643, 644 of the contact arm 640 of the member selector 510 (manually controlled operation) through the wires 676 and 678.

One terminal of each of these relays is directly connected to the phase R of the three-phase supply and the other terminal thereof is connected as stated in the preceding paragraph to the respective contact studs of the contact arms 620, 640 respectively of the two member selectors and thence through a circuit comprising the wire 679 and contact 673 for selector 505 and wire 680 and contact 672 for selector 510 both returning through the wire 681 to phase T of the supply.

The input terminals of the relays 160, 165 controlling the rotation of the motors 115, 116, 117, 118 respectively in the forward or reverse direction are directly connected to the phase R of the supply while their output terminals are connected respectively through wires 682 and 683 to the direction selectors 506, 507, 508 and 509 and through circuits which presently will be described in the description of the operational sequence.

Each member of the machine, when no feed motion is imparted thereto, must be firmly clamped on its supporting member. For each of the four members above referred to, the clamping actions are respectively controlled by the motors 291, 292, 293 and 294 (Fig. 11) which are fed from the three-phase supply RST and controlled by means of "forward" and "reverse" relays permitting these motors to rotate in both directions. These relays are controlled by corresponding "clamping" buttons 91, 92, 93 and 94 and by "unclamping" contacts 41, 42, 43 and 44, these unclamping contacts being operated by the end thrust exerted on the corresponding direction selectors 506, 507, 508 and 509, Fig. 9.

The pilot lamps 341, 342, 343 and 344 are those which respectively illuminate the translucent rings correspondingly numbered on the front portion of the control box, Fig. 1, at the right side thereof, each pilot lamp being positioned level with the direction selector located to be associated with the member the clamping of which is indicated by the lamp.

The hereinabove described control box operates as follows:

When the machine is in its inoperative condition, the control disk 570 is in its inoperative position so that the contacts 670, 671 and 672 are open while the contacts 673 and 674 are closed.

The member selectors 505 and 510 as well as the direction selectors 506, 507, 508, 509 may have been left in any position. The "automatic" operation speed selecting lever 520 may have been left positioned so as to register with any of the notches Vm, E, W, Q or R. Ordinarily all the movable members will have remained clamped except the member involved in the last operation of the machine, for instance, the table 9.

It will be assumed that the operation to be carried out next is to move the headstock 8 toward the right on the carriage 7 through a "manually controlled" feed movement. The movement selector 510 is rotated to the position in which the arrow-shaped handle of this selector will be directed toward the direction selector 508 located on the pictorial representation of the headstock 8, Figs. 1 and 9. The direction selector 508 is rotated so as to direct the arrow head formed by its handle to the right which is the desired direction of movement of the headstock 8. This selector handle 508 then is pressed axially to close the headstock unclamping contact 43, thus causing relay 315 to be energized and hence the closing of its contacts 316, 317, 318 and 319. By closing the contact 316 the holding circuit of relay 315 is maintained after the selector 508 is released from axial pressure. The closing of contacts 317, 318, 319 will energize the motor 293 in the unclamping rotational direction; the nut 332 will be moved toward the left, Fig. 11, and when the member is unclamped it will open the switch 335 which is in the holding circuit with contact 316, thus cutting the holding circuit of contactor 315 and stopping the motor.

The control panel is then checked to ascertain whether all other movable members are suitably clamped. Thus, in the case contemplated, the operator will depress the button 94 to effect clamping of the table 9. Pressing of button 94, effects the clamping of the table which was previously unclamped and will cause relay 700 to be energized through the closed contact 720. The energization of relay 700 will then close the contacts 701, 702, 703, 704. The closing of contact 701 will maintain the holding circuit of relay 700 after the push button 94 has been released. Upon closing of the contacts 702, 703, 704 the motor 294 will be energized for the reverse rotary direction to produce movement towards the right in Fig. 11 of nut 722. In this movement this motor will therefore cause the table 9 to be clamped and on reaching the end of its movement, the nut 722 will open the limit switch 720, thus deenergizing the relay 700 and stopping the motor 294 while concomitantly closing the contact 721 which will switch on the pilot lamp 344 thereby indicating that the table 9 is suitably clamped. Similarly, pressing buttons 91 and 92 will clamp the column 6 and the carriage 7.

The operation of selector 510 to point its arrow toward the direction selector 508 will connect the corresponding feed motor 117 for the headstock 8 to the terminals of the generator 120 upon closing contacts 137 when relay 132 controlling the connection of motor 117 is energized. Relay 132 is connected, on the one hand, to the R phase of the supply and, on the other hand, to the T phase thereof through the circuit comprising the respective wire 676, corresponding wire 678, contact stud 643, brush contact 640 of member selector 510, wire 680, contact 672 of the manual operation device, wire 681 and phase T.

The setting of the direction selector 508 pointing toward the right Fig. 9 brings the brush contacts 730 and 735 respectively into engagement with the contact studs 731 and 736. These brush contacts 730 and 735 in cooperation with the contact studs 731, 732 and 736, 737 control the circuits respectively to the forward movement relay 160 and the reverse movement relay 165. As will be understood from the description of the circuits to follow, these brush contacts 730 and 735 are connected in circuit with the brush contacts 635 and 640 of the member selector 510 for conditioning the circuit for movement of the selected member in the selected direction.

However, the motor 117 cannot start yet because the generator 120 driven by the three phase motor 119 will carry no load since its field winding 123 is not yet connected to the exciter 121, both relays 160 and 165 being still deenergized.

If it is desired to feed the headstock 8 which is now conditioned for movement toward the right, the manual control disk 570 is moved from its initial position and the cam 582 closes the contacts 670, 671, 672 while opening the contacts 673, 674. The opening of the contact 674 will immediately lock the "automatic" operation speed control by opening the circuit through the starting contact 549 actuated by the lever 520 while the opening of the contact 673 will similarly lock the "automatic" operation member selection by opening the circuit through the brush 620 of selector 505. This member selection as already stated will take place for "manual" operation with the selectors 510 and 508 in the positions shown in Fig. 9 through the contact 672 closed upon moving the disk 570, wire 680, brush 640 of "manual" operation member selector 510, stud 643 of this selector, corresponding wires 678 and 676 to relay 132 and thence to the phase R of the supply.

The closing of the contact 670 connects for operation the "manual" control slider 191 through the closing of the contact 211 of the relay 210 energized through the circuit comprising phase T of the supply, wire 681, contact 670, wire 699. relay 210, phase R of the supply.

Closing the contact 671 will secure the direction selection, that is, the energization of the forward direction relay 160 through a circuit from phase T of the supply, wire 681, closed contact 670, closed contact 671, brush 635 of the member selector 510, contact stud 638, wire 741, brush 730 of the direction selector 508, stud 731 of this selector, wire 682, forward direction relay 160 and phase R of the supply.

From the preceding explanations it will be seen that the output of the exciter 121 is directed into the field winding 123 of the generator, but as motor 117 is already connected to the generator, as explained at the beginning of the description, it will start since its field winding 134 is steadily energized with a current derived from the exciter 121 as shown in Figs. 7 and 8. Therefore, the motor 117 will attain a speed which is in accordance with the position of the slider 191 controlling the feed under manual control and will move the headstock 8 at this speed which may be varied by movement of the slider 191 effected by the receiver 200 connected through wires 653 to transmitter 201 upon the shaft of which the control disk 570 is fastened. The selected member is set in motion at the minimum speed as soon as the disk 570 is rotated away from its initial position and thereafter the more this disk is rotated by continued pressure of the finger the greater the speed which will be attained until the whole of the rheostat 190 is short circuited which produces maximum speed of the driving motor.

For moving any other movable member of the machine the member selector 510 is rotated so as to point toward the depicted member desired to be moved, that is, toward the direction selector associated with such member and this direction selector is set according to the desired direction of movement of the selected member. Before starting movement, however, the headstock 8 which was unclamped for movement is clamped by pressing push button 93 and the member which it is now desired to move is unclamped by pressing the direction selector associated with the depicted selected member.

In the automatic control, the selection of the member to be moved and the selection of the direction of this movement are carried out in the same way as above described except that member selector 505 is actuated instead of member selector 510.

The speed control for automatic operation, however, is different since, instead of having the manually controlled disk for adjusting the speed, a 5-position feed lever 520 is provided adapted to be moved upwards and downwards at the selected position respectively to start and stop the member concerned.

It will be understood that the clamping and unclamping of the various members take place in the same manner as for manual control.

I will now describe more completely the mutual arrangement of the different elements contained in the control box and already described per se hereinabove. To this end, I refer now more particularly to Figs. 12 and 13. The control device for selecting the speeds shown in section in Fig. 12 is similar to the device shown diagrammatically on Fig. 10 and the same references have been adopted for similar members.

Beside this control device, on the left hand side is mounted the lighting device 56 with its switch 57 (Fig. 12). The manual control devices 570, located at the right hand bottom part in Fig. 12, is similar to that described with reference to Figs. 4 to 6, the similar members being designated by the same reference members in Figs. 12-13 and 4-6. However a flat spiral spring 435 (Fig. 12) is substituted for the wire helical spring 575 of Figs. 5 and 6 and the resilient stop 614 of Fig. 5 is replaced by a rigid one 436 (Fig. 12) which in the resting position of disc 570 is in engagement with a part 437 which carries a stud 439 operatively connected to one end of spring 435 the other end of which is attached to a stud 436 secured to the casing 499 of the control box. As may be readily seen in Fig. 12, the shaft 571 of disc 570 is directly coupled to the transmitter 201.

In the middle of Fig. 12, the reference numbers 421 and 422 apply to the shaft of movement selectors 505 and 510 respectively, whereas numerals 423, 424, 425 and 426 designate the shafts of direction selectors 506, 507, 508, 509 respectively as stated with reference to Fig. 1. Besides these selectors, on the right hand side may be seen the signal lamps 341, 342, 343, 344 also already mentioned with reference to Fig. 1. These lamps are arranged in a special casing 441, with screens 442 between the lamps. The exterior plate of said casing is provided with holes 443 for cooling purposes. This exterior plate is removable and is secured to the casing 499, by means of screws 444.

The top of the right hand side wall of the portable station casing shows the knob 111 rigid with drum 209 and whose shaft 440 is directly coupled to transmitter 206 for adjusting the "working" feed previously mentioned.

This application is a divisional application from the application Serial No. 19,454 filed April 7, 1948, which was itself a continuation in part of the applications Serial No. 691,362 filed August 17, 1946, and Serial No. 780,670 filed October 18, 1947.

What I claim is:

1. In a controller for controlling the speed or operation of a machine, the combination with a speed control device capable of being connected to said machine and having a control member movable to different successive positions for determining for each position a different speed of said machine, of a support, a control part provided with at least one opening to receive a finger of the hand and supported by said support for movement thereof relative to said support to move said opening to different successive positions along a predetermined path, said control part being operatively connected to said control member to move said member to different successive positions concomitantly with said movement of said control part to its different successive positions to determine different speeds of operation of the machine by the position of the finger in said opening along said path, and a stop supported by said support adjacent the path of movement of said opening and adapted to be engaged by said finger of the hand to stop said control part with said opening in a predetermined position along said path corresponding to a predetermined speed of the machine.

2. In a controller for controlling the speed of operation of a machine, the combination as defined in claim 1 in which said control part is supported for said movement thereof from and for return to an inoperative position, which comprises bias means operatively connected to said control part for urging said control part toward said inoperative position thereof, and an abutment carried by said support, said control part having a portion adapted to engage said abutment for determining said inoperative position.

3. In a controller for controlling the speed of the operation of a machine, the combination with a speed control device capable of being connected to said machine and having a control member movable to different successive positions for determining for each position a different speed of said machine, of a support, a control part provided with at least one opening to receive a finger of the hand and supported by said support for movement thereof relative to said support from and for return to an inoperative position to move said opening to different successive positions along a predetermined path and return thereof to an initial position, said control part being operatively connected to said control member to move said member to different successive positions concomitantly with said movement of said control part to its different successive positions to determine different speeds of operation of the machine by the position of the finger in said opening along said path, bias means operatively connected to said control part for urging said control part toward said inoperative position thereof, an abutment carried by said support, said control part having a portion adapted to engage said abutment for determining said inoperative position, an auxiliary element supported by said abutment for movement relative to said abutment upon engagement of said portion of said control part with said auxiliary element in said inoperative position of said control part, and a second bias means cooperating with said auxiliary element to provide for yielding movement of said auxiliary element upon such engagement under the impelling force of said first bias means and capable of resisting said force to restore said control part to said inoperative position thereof.

4. In a controller for controlling the speed of the operation of a machine, the combination with a speed control device capable of being connected to said machine and having a control member movable to different successive positions for determining for each position a different speed of said machine, of a support, and a control part provided with at least two openings each adapted to receive a finger of the hand, said control part being supported by said support for movement thereof relative to said support to move said openings in succession to different successive positions along a predetermined path, said openings being disposed on said control part in spaced relation along said path and so as respectively to be movable by said finger inserted therein to a predetermined position in said path and to be returned to positions corresponding to an initial position of said control part, said control part being operatively connected to said control member to move said member to different successive positions concomitantly with said movement of said control part to its different successive positions to determine at least two different operating speeds of said machine and at least two different ranges of speed corresponding to the movements of the finger in said two openings to said predetermined position.

5. In a controller for controlling the speed of operation of a machine, the combination as defined in claim 4 which comprises a stop supported by said support adjacent the path of movement of said openings and adapted to be engaged by said finger of said hand to stop said control part with the respective openings in said predetermined position along said path according as said finger is inserted in one opening or the other.

6. In a controller for controlling the speed of operation of a machine, the combination with a speed control device capable of being connected to said machine and having a control member movable to different successive positions for determining for each position a different speed of said machine, of a support, a control part provided with at least one opening to receive a finger of the hand and supported by said support for rotational movement thereof relative to said support to move said opening to different successive positions along a circular arc, said control part being operatively connected to said control member to move said member to different successive positions concomitantly with said movement of said control part to its different successive positions to determine different speeds of operation of the machine by the position of the finger in said opening along said arc, and a stop supported by said support adjacent the arc of movement of said opening and adapted to be engaged by said finger of the hand inserted in said opening to stop said control part with said opening in a predetermined position along said path corresponding to a predetermined speed of the machine.

7. In a controller for controlling the speed of operation of a machine, the combination as defined in claim 1 which comprises a bar supported by said support substantially in a plane parallel to said path and perpendicular to said inserted finger, said bar being adjacent the position of the hand when the finger thereof is inserted in said opening of said control part to receive the bearing of the body of the hand held thereagainst in controlling the movement of said control part by said finger.

References Cited in the file of this patent

UNITED STATES PATENTS

| Number | Name | Date |
|---|---|---|
| 865,818 | Powell | Sept. 10, 1907 |
| 991,206 | Horton | May 2, 1911 |
| 1,092,281 | McWilliams | Apr. 7, 1914 |
| 1,391,418 | Reed | Oct. 21, 1919 |
| 1,482,858 | Nigh et al. | Feb. 5, 1924 |
| 1,618,790 | Watson | Feb. 22, 1927 |
| 1,838,289 | Smith | Dec. 29, 1931 |
| 1,861,511 | Russell | June 7, 1932 |
| 1,969,926 | Eickhoff | Aug. 14, 1934 |
| 2,365,359 | Rubens | Dec. 19, 1944 |
| 2,522,779 | Culkosky | Sept. 19, 1950 |
| 2,543,965 | Hamilton | Mar. 6, 1951 |